(12) United States Patent  
Arora (10) Patent No.: US 8,655,880 B2
(45) Date of Patent: Feb. 18, 2014

(54) GRAPHICAL INFORMATION NAVIGATOR (75) Inventor: Dinesh Arora, Cupertino, CA (US)

(73) Assignee: Oracle International Corporation, Redwood Shores, CA (US)

(*) Notice: Subject to any disclaimer, the term of this patent is extended or adjusted under 35 U.S.C. 154(b) by 552 days.

(21) Appl. No.: 12/753,067

(22) Filed: Apr. 1, 2010

(65) Prior Publication Data

US 2011/0246401 A1 Oct. 6, 2011

(51) Int. Cl.
G06F 17/30 (2006.01)

(52) U.S. Cl.
USPC .......................... 707/737; 707/802

(58) Field of Classification Search
USPC ................................. 707/737, 802
See application file for complete search history.

(56) References Cited

U.S. PATENT DOCUMENTS

| | | | |
|---|---|---|---|
| 6,496,208 B1 | 12/2002 | Bernhardt et al. | |
| 6,829,615 B2 | 12/2004 | Schirmer et al. | |
| 6,985,898 B1 | 1/2006 | Ripley et al. | |
| 7,065,714 B1 | 6/2006 | Theel et al. | |
| 7,131,069 B1 | 10/2006 | Rush et al. | |
| 7,512,885 B2 | 3/2009 | Walsh et al. | |
| 7,647,309 B1* | 1/2010 | Bar | 707/713 |
| 2005/0159970 A1* | 7/2005 | Buyukkokten et al. | 705/1 |
| 2006/0004914 A1* | 1/2006 | Kelly et al. | 709/219 |
| 2007/0247641 A1* | 10/2007 | Okuma et al. | 358/1.1 |
| 2008/0178101 A1 | 7/2008 | Rode et al. | |
| 2009/0077496 A1 | 3/2009 | Aravamudan et al. | |
| 2009/0265359 A1* | 10/2009 | Barsook et al. | 707/10 |
| 2010/0162165 A1* | 6/2010 | Addala et al. | 715/810 |

OTHER PUBLICATIONS

Derthick, Mark, et al.; "An Interactive Visual Query Environment for Exploring Data", proceedings of the ACM Symposium on User Interface Software and Technology (UIST '97), ACM Press, Oct. 1997. pp. 189-198.
Db Visualizer—Table Data Navigation, obtained at http://www.minq.se/products/dbvis/doc/main/doc/ug/navigator/navigator/html; Oct. 2008; 8 pages.
US 7,595,802, 09/2009, Nonclercq et al. (withdrawn)

* cited by examiner

*Primary Examiner* — Son T Hoang
(74) *Attorney, Agent, or Firm* — Trellis IP Law Group, PC (57) ABSTRACT

Embodiments facilitate graphical navigation of data. In a specific embodiment, the system includes a graphical user interface that is adapted to graphically depict data via one or more displayed icons. The graphical user interface is further adapted to enable a user to cause the display of a first icon and one or more additional icons associated therewith by selection of the first icon. A learning module is adapted to monitor use of the graphical user interface and to adjust behavior of the graphical user interface in response to learned information obtained from monitoring the use of the graphical user interface. The system may be specifically adapted to facilitate user navigation of data that is maintained by Enterprise Resource Planning (ERP) software.

15 Claims, 7 Drawing Sheets

GRAPHICAL INFORMATION NAVIGATOR

BACKGROUND

This application relates in general to data access, display, and/or manipulation and more specifically to systems and methods for providing graphical depictions of data and/or data relationships to facilitate navigating the data and performing desired operations with or on the data.

Graphical interfaces for facilitating navigating data are employed in various demanding applications, including Customer Relationship Management (CRM), search engine, corporate billing, and general Enterprise Resource Planning (ERP) applications. Such applications often employ databases designed to facilitate rapid access to relevant information.

Unfortunately, user access to data and methods for navigating data stored in conventional databases are often limited by a particular database design. Desired information, such as information associated with a given user, may be positioned in different portions of the database. The database may lack mechanisms for quickly navigating from the user's data to other related information.

Generally, information access in a conventional database relies upon the user knowing what they are searching for. For example, if a particular table in a database indicates that an employee works in Houston, it may be cumbersome to quickly determine all employees that work in Houston, unless the database has been designed to provide quick access to the specific information via the database table. To determine all employees that work in Houston, the user may need to perform a direct database query to retrieve the information. An additional query may be required to obtain more information about the employees' jobs. Such additional queries may be inefficient and may result in the user making important decisions without relevant knowledge.

Underlying database design is often relatively fixed for an end user that lacks experience in modifying database structures. Consequently, when an end user finds inefficiencies in the database design, such as aspects that hinder user access to data, changes to the database may require hiring of outside consultants to restructure the database. This can be costly for businesses whose information-access needs often change. Data-access inefficiencies that inhibit information access may result in further business inefficiencies by increasing the tendency for businesses to make important decisions with less than complete data about a particular issue or task.

To overcome information-access issues, businesses may contract with specialists to generate detailed reports. However, this can be undesirably time consuming and costly. This can be particularly problematic when a business decision relying upon the detailed reports must be made quickly.

Efficient data access and navigation ability is particularly important in large ERP systems, which may include various intercommunicating databases that may maintain terabytes of data. An example ERP system includes one or more software applications that aim to manage information and functions of a business and to promote seamless integration of all the information flowing through a company, the information of which may be located in various shared data repositories.

Unfortunately, traditional ERP systems typically offer very limited ways to explore data. Relatively fixed underlying database designs offer a relatively rigid and defined path to information, which may inhibit efficient data access.

SUMMARY

An example system for facilitating graphical navigation of data includes a graphical user interface that is adapted to graphically depict data via one or more displayed icons where each icon corresponds to objects and/or object relationships in an ERP database. The graphical user interface is further adapted to enable a user to cause display of a first object and one or more second objects associated therewith by selection of the first object. A learning module is adapted to monitor use of the graphical user interface and to adjust behavior of the graphical user interface in response thereto based on learned information obtained from monitoring the use of the graphical user interface.

In a more specific embodiment, the system is adapted to facilitate navigating data maintained via Enterprise Resource Planning (ERP) software. The ERP software stores data to be selectively displayed by the graphical user interface. Computer readable instructions in communication with the learning module are adapted to employ the graphical user interface to suggest one or more navigations to a user based on navigation information collected from plural users of the system.

Another embodiment provides A method for navigating among Enterprise Resource Planning (ERP) data in a computing environment, the method comprising the following acts performed by a digital processor: displaying a plurality of icons, wherein the icons correspond to one or more groupings of data in an ERP database; displaying connections between displayed objects, wherein the connections are based on one or more relationships between the displayed icons in the ERP database, wherein one icon is the central icon of the relationships, wherein the central icon is centrally displayed and includes multiple connections spanning radially outward to multiple other displayed objects; accepting a signal from a user input device to select an icon that is not the central icon; designating a new central icon in response to selected icon; creating a new display of icons and connections with the new central icon centrally displayed and including multiple connections spanning radially outward to multiple additional displayed objects; aggregating information about which of the icons are selected more frequently by one or more users; and using the aggregated information to selectively adjust graphical display of information contained in the ERP database.

Certain embodiments disclosed herein can overcome problems associated with conventional ERP systems, in part by enabling user adjustments to the visibility of information in the system. The display of information may be adjusted in accordance with importance, frequency of access, or via user defined criteria, such that more important or frequently accessed data (or data meeting user-defined criteria) is displayed more prominently.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

For example, while the present application is discussed with respect to graphical display of information maintained in an Enterprise Resource Planning (ERP) system, embodiments are not limited thereto. Certain embodiments may be adapted to work with individual databases not related to enterprise management. Those skilled in the art with access to the present teachings may readily adapt embodiments disclosed herein to various different applications without undue experimentation and without departing from the scope of the present teachings.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
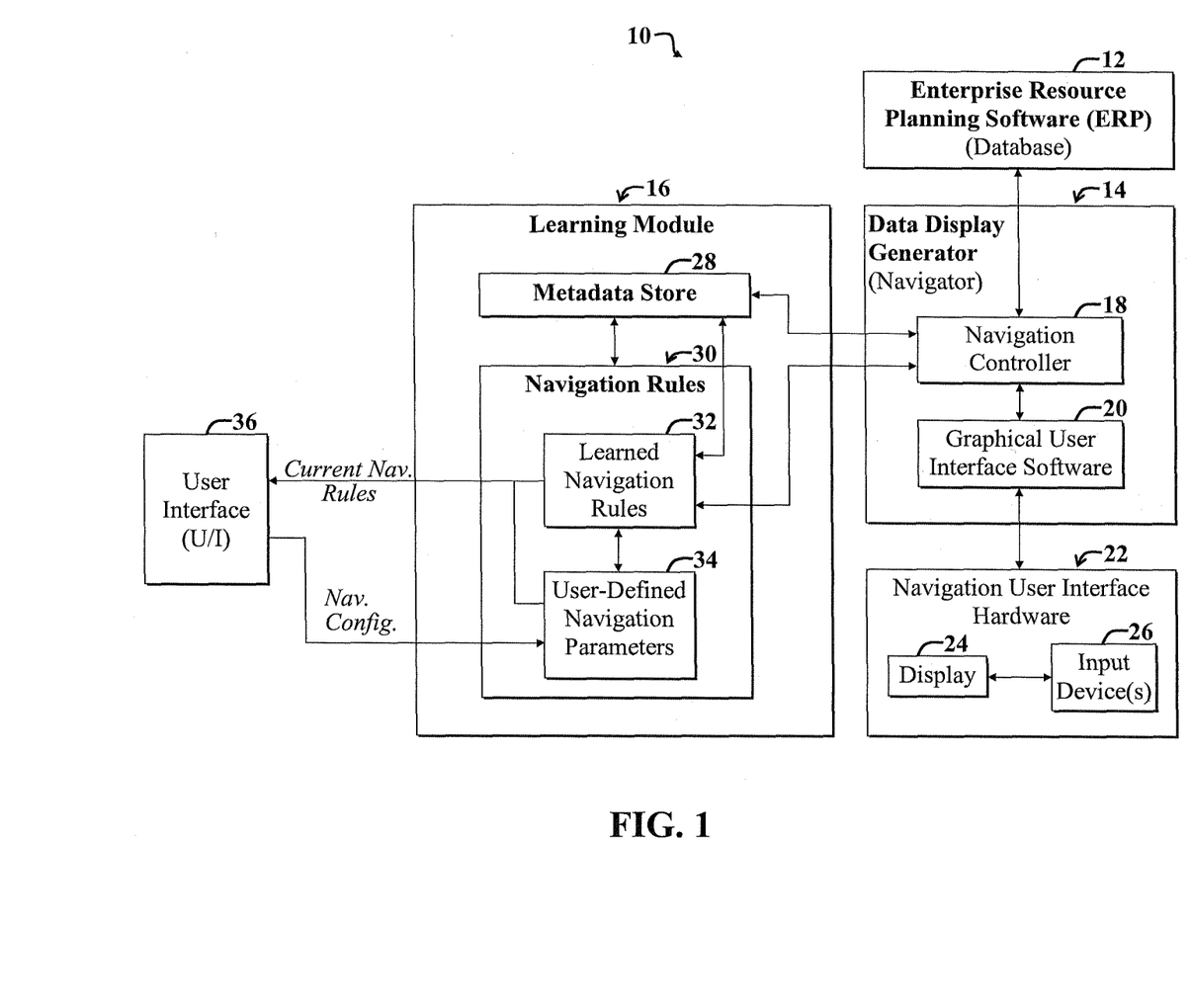
FIG. 1 is a diagram illustrating a first example embodiment of a data navigating system for employing learning to facilitate graphically navigating data in an enterprise computing environment.

FIG. 1 is a diagram illustrating a first example embodiment of a data navigating system 10 for employing learning to facilitate graphically navigating data in an enterprise computing environment.

For the purposes of the present discussion, a computing environment may be may be any collection of computing resources used to perform one or more tasks involving computer processing. An enterprise computing environment may be any computing environment used for a business or public entity. An example enterprise computing environment includes various computing resources distributed across a network and may further include private and shared content on Intranet Web servers, databases, files on local hard discs or file servers, email systems, document management systems, portals, Enterprise Resource Planning (ERP) systems, and so on.

An ERP system may be any computer-based system or architecture that is adapted to facilitate the flow of information between business functions. ERP systems often employ one or more connected databases and a common computing platform to consolidate business operations into an enterprise wide system environment. Example tasks facilitated by certain ERP systems include managing internal and external resources, including accounting, material, and human resources. Example readily available ERP systems include Oracle e-Business Suite, PeopleSoft, SAP (Systems Applications and Products) ERP, and so on. For the purposes of the present discussion, a database may be any collection of data.

The system 10 includes ERP software 12 in communication with a data display generator 14, also called a navigator engine. The data display generator 14 communicates with navigation user interface hardware 22, which, for illustrative purposes, is shown including a physical display 24 and one or more input devices 26. The data display generator 14 includes a navigation controller module 18, which is coupled to graphical user interface software 20. A user may employ the navigation user interface hardware 22 to interact with functionality provided by the graphical user interface software 20. Note that while the navigation user interface hardware 22 and the graphical user interface software 20 are shown separately, the graphical user interface software 20 in combination with the navigation user interface hardware 22 may be considered to represent a single user interface.

For the purposes of the present discussion, a graphical display generator, such as the data display generator 14, may be any mechanism or module that is adapted to facilitate selective graphical display of data and relationships between data, where the data is stored in one or more databases. A module may be any grouping of functionality. While modules are typically shown herein via a box, note that a module may include functionality distributed in different locations in a computing system.

While the system 10 is shown as including various separate modules, the various functionality illustrated thereby may be grouped differently. For example, in practice, certain modules 12-36 of FIG. 1 may be incorporated into a single software package or executable, without departing from the scope of the present teachings. In general, the system 10 may be implemented via software running on one or more computers and data and functionality stored via one or more data storage mediums such as hard drives, Random Access Memory (RAM), and so on.

The data display generator 14 further communicates with a learning module 16. The learning module 16 includes a metadata store 28 in communication with navigation rules 30. The navigation rules 30 include learned navigation rules 32 and user-defined navigation parameters 34. The learning module 16 is coupled to a second user interface 36, which is adapted to facilitate enabling a user to modify the navigation rules 30, such as the user-defined navigation parameters 34, as discussed more fully below. For clarity, the user interface 36 is shown separately from the navigation user interface hardware. However, in practice, the user interface 36 and the user interface hardware 22 may be incorporated into a single interface that accessible via similar user interface hardware and software.

In operation, the navigation controller 18 includes instructions for collecting data from one or more databases of the ERP software 12 in accordance with instructions from the learning module 16 and the graphical user interface software 20. The collected data is employed by the graphical user interface software 20 to generate various displays. The displays of data are adjusted by the graphical user interface software 20 in accordance with the navigation rules 30, data maintained in the metadata store 28, instructions implemented by the graphical user interface software 20, and user input provided via the user interface hardware 22.

As a user browses, i.e., navigates data displayed via the display 24, the user may select various graphical depictions of data and/or functionality, called displayed objects, as discussed more fully below. For the purposes of the present teachings, an object or data object may be any grouping of data and/or functionality. A representation of an object, i.e., a displayed object, may be displayed via a bubble, dialog box, or other graphical depiction. The graphical depiction of an object may also be called an object, a displayed object, or a node.

As a user selects different displayed nodes, the graphical user interface software 20 triggers display of other related nodes in accordance with the navigation rules 30. The user is said to navigate data by selecting different nodes in a graphical display to access other nodes and related data and/or functionality.

For the purposes of the present discussion, a user navigation may refer to a transition of the graphical user interface display from a first display of one or more objects to a second display of one or more objects in response to user selection of an object or control in the first display of one or more objects. A user is said to navigate data if the user selects one or more different displayed objects to activate other objects to be displayed. Data navigating behavior of a user may be any tendency of a user to perform one or more particular navigations or sequences of navigations.

As a user navigates data displayed via the display 24 and graphical user interface software 20, information pertaining to user navigations is stored in the metadata store 28. In an enterprise computing environment, multiple users may employ the system 10. Accordingly, the metadata store 28 is adapted to collect and store descriptions of navigations, i.e., navigation information, from multiple users.

For the purposes of the present discussion, navigation information may be any information pertaining to how a user is accessing stored data. For example, navigation information may specify that users of the system 10 have been navigating from an employee object to a residence-location object more frequently than the users have been navigating from an employee object to a benefits-enrollment object.

In an example operative scenario, the navigation rules 30 specify that nodes and/or paths to nodes that are navigated to/via more frequently by users of the system 10 are to be displayed more prominently via the display 24. The navigation rules 30 may further specify that nodes that are frequently navigated to via a particular node be displayed as a suggestion when a user navigates to the particular node. The display of the suggested navigation may be implemented via an additional node coupled directly to the particular node. Alternatively, the displayed suggestion may be displayed separately, i.e., unconnected to a particular node, or as a link within the particular node.

The learned navigation rules 32 are said to include learned rules, since the learned navigation rules 32 are adapted to access the metadata store 28 to ascertain, i.e., learn user navigation behavior and to make adjustments to the way data is displayed in response thereto. These adjustments are made in accordance with any applicable user-defined navigation parameters 34, as discussed more fully below. To effect adjustments to the way data is displayed on the display 24, appropriate instructions are forwarded from the navigation rules module 30 to the navigation controller 18. The navigation controller 18 then activates instructions to disperse collected data for display to the graphical user interface software 20 in accordance with the navigation rules 30.

For the purposes of the present discussion, an object is said to be more prominently displayed if the user may more readily access the graphical representation of the object via the user interface. For example, an initially displayed set of data objects are considered to be more prominently displayed than data objects that must be navigated to via multiple steps.

The navigation rules module 30 may monitor the navigation behavior of plural users of the system 10 with reference to the metadata store 28 to adjust the graphical display of data in response thereto. The navigation rules 30 may be configured to group data from different users differently, and adjust displayed navigations to a particular user based on which group the user belongs. In an example grouping, users are grouped by their level of data and functionality access permissions. In this case, the navigation behavior of users with similar access permissions may be monitored separately from users with different access permissions.

In an example operative scenario where managers have similar broad permissions, and lower level employees have similar more narrow permissions, the navigation rules 30 may treat navigations of managers separately from navigations of the lower level employees. In this case, for example, if managers tend to navigate to a particular node more frequently than other nodes, then the particular node may be displayed more prominently for managers accessing the system 10, whereas the same node may or may not be displayed more prominently for lower level employees using the system 10. Similarly, navigation behavior of lower level employees may be monitored separately from navigation behavior of higher level employees such that the graphics displayed to a low-level employee are tailored in accordance with the navigation behavior of low-level employees in general.

The metadata store 28 is said to learn about user navigation behavior as users navigate data via the navigation user interface 22. The learned navigation information is then used by various modules 30, 18, 20 to selectively adjust how objects, including associated data and functionality, are graphically depicted on the display 24. Graphical depictions of data may be adjusted in addition to graphical depictions of functionality, and the overall behavior of the displayed interface may also be affected. For example, if the learning module 16 determines that data from a particular node is often transported to a form in another node, the system 10 may automatically populate the other node with data from the particular node the particular node is navigated to via the navigation user interface hardware 22.

The graphical user interface software 20 may include login functionality to collect initial user information, such as data and functionality access privileges, job title, user identity, and so on. Note that the present operative scenario, data navigation via the system 10 for a particular user is automatically customized in accordance with the behavior of users with similar access permissions. However, embodiments are not limited thereto. For example, different groupings not based solely on user permissions, such as groupings based on job title, or some other criterion or criteria, may be employed without departing from the scope of the present teachings.

The system 10 is further adapted to enable a user, such as a user with administrator access privileges, to view and selectively modify the navigation rules via the user interface 36. For example, in the present example embodiment, a user may register certain actions with the system 10 by selectively augmenting the user-defined navigation parameters 34 with a description of the action. The description of the action may include requisite instructions and information for implementing the particular action, such as pointers to particular software routines, rules for when to activate the routines, and so on. Modification functionality may be facilitated by software included in the user interface 36. The software may include one or more menus for selecting built-in options and modifications.

Examples of actions that may be registered via the user interface 36 and stored in the user-defined navigation parameters module 34 include: an action that causes a transfer of data from a first node to a second node when a particular control or button in or associated with the first node is selected; an action that triggers display of certain specific nodes when a particular node or type of nodes is selected by a user; an action that causes collapse of certain nodes into a specified node when a particular node is selected; an action that triggers the prominent display of a benefits-enrollment node coupled to or displayed within a particular user's node when the user is allowed to enroll in a benefits plan; an action that triggers the prominent display of a particular node at a particular time or time interval; an action that changes the relationship between particular nodes that is used by the navigation controller 18 to provide display instructions to the graphical user interface software 20; an action that performs a particular function in a particular software product that is in communication with the ERP system 12, and so on.

Hence, the system 10 may be considered a system for facilitating navigating data managed by Enterprise Resource Planning (ERP) software 12, where the system 10 includes one or more databases 12; a graphical display generator 14 coupled to the one or more databases 12, where the graphical display generator 14 is adapted to facilitate display of data from the one or more databases 12; a metadata store 28 in communication with the graphical display generator 14; a set of data navigation rules 30 in communication with the graphical display generator 14, where the set of navigation rules affect display of the data based on information in the metadata store 28, wherein the graphical display generator 14 is adapted to facilitate graphical display of one or more data objects in accordance with information maintained in the metadata store 28 and in accordance with the data navigation rules 30; and a user interface 20, 22 in communication with the graphical display generator 14, wherein the graphical display generator 14 is adapted to employ the metadata store 28 to collect information provided via user input, where the information characterizes how one or more users of the system 10 have been navigating data in the one or more databases 12.

The data display generator 14 is adapted to prominently graphically display one or more data objects in accordance with a frequency at which the one or more data objects are accessed by one or more users of the system 10. A first mechanism 20, 22 is adapted to enable a user to register an action with the system 10 by adjusting the user navigation rules 30 to affect how the action is implemented in response to user selection of a graphically displayed object. The system 10 further includes a second mechanism 34, 36 that is adapted to enable a user to modify contents of the metadata store 28 and/or the navigation rules 30. For example, a user may employ the user interface 36 to selectively delete contents of the metadata store 28. In this case, the display of data and the associated navigation functionality provided by the system 10 will revert back to a default state. The default state may be user configurable.

Alternatively, the system 10 may be considered a system for facilitating data navigation, where the system 10 includes: a graphical user interface 20, 22 adapted to graphically depict data via one or more displayed objects, where the graphical user interface 20, 22 is further adapted to enable a user to display contents of a first object and one or more second objects associated therewith by selection of the first object; and a learning module 16 that is adapted to monitor use of the graphical user interface 20, 22 and adjust behavior of the graphical user interface 20, 22 in response thereto based on learned information stored in the metadata store 28. Note that learned information corresponds to information gathered from the monitoring of the use of the graphical user interface 20, 22 and the graphical depictions of objects provided thereby.

In this case, the system 10 employs the navigation rules 30 and the navigation controller 18, which include a set of computer readable instructions for employing the graphical user interface 20, 22 to suggest one or more navigations to a user based on navigation information collected from plural users of the system 10; to selectively adjust the prominence of the display of particular nodes; to implement certain actions or behavioral characteristics that have been registered with learning module 16, and so on. The plural users of the system 10 may have similar access permissions to the data as the user or may be characterized by a similar categorization, e.g., manager, lower-level employee, contractor, etc.

The graphical user interface 20, 22 communicates with the graphical data display generator 14, wherein the graphical data display generator 14 implements instructions for initially displaying predetermined objects when a user logs into the system 10, where the predetermined objects are determined based on the learned information maintained via the metadata store 28. The instructions are provided via the navigation rules 30 and are user modifiable.

In an example operative scenario, the graphical display generator 14 is further adapted to implement instructions for selectively collapsing one or more displayed objects, i.e., nodes, within one more other displayed objects, thereby enabling nesting of objects based on one or more relationships between one or more objects. An example user interface display depicting the nesting of nodes is discussed more fully below with reference to FIG. 4.

The learning module 16 includes instructions for adjusting relationships between one or more displayed objects in accordance with user navigations of the data as indicated by the learned information, which is maintained in the metadata store 28.

Computer-readable instructions, e.g., software code, maintained by the learning module 16 and implemented via the navigation controller 18 and graphical user interface software 20, are adapted to enable adjustments to the prominence of the display of an object by the graphical user interface 20, 22 based on a frequency of which the object is selected by one or more users of the system as indicated by the learned information maintained in the metadata store 28. The graphical user interface 20, 22 may be adapted to selectively transfer information from a first object to fields of a second object in response to selection of the second object via the first object in accordance with one or more navigation rules, as discussed more fully below with reference to FIG. 6. The one or more navigation rules 30 are adapted to cause the graphical user interface 20, 22 to display the second object to a user only if the user has permissions allowing the user to access the second object from the first object.

In the present example embodiment, the graphical user interface software 20 includes a mechanism, e.g., software login code, which may include one or more Access Control Lists (ACLs), for determining permissions of a user. The permissions may specify whether a user has the right or privilege to access certain data and/or functionality.

Figure 2:
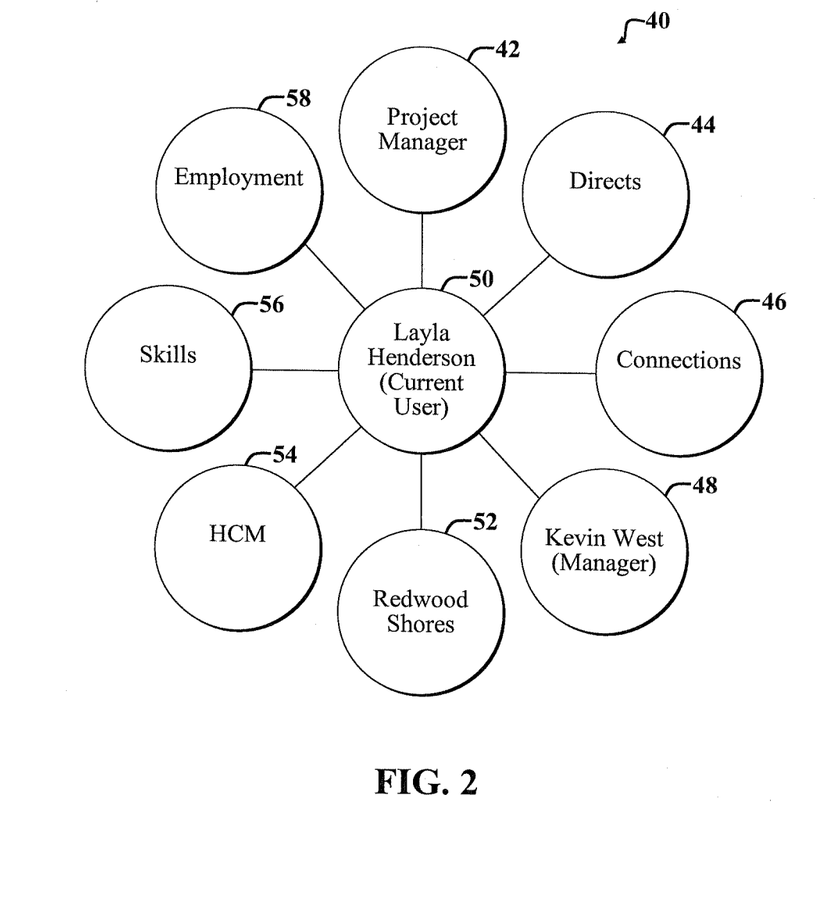
FIG. 2 is a diagram illustrating a first example display screen generated by the system of FIG. 1.

FIG. 2 is a diagram illustrating a first example display screen 40 generated by the system 10 of FIG. 1. The first example display screen 40 illustrates a set of top-nodes 42-58. For the purposes of the present discussion, top nodes may be any nodes initially displayed upon activation of the system 10 of FIG. 1 after any requisite login procedures.

With reference to FIGS. 1 and 2, the top nodes displayed to a particular user may vary depending upon the previous data navigation behavior of users that are similarly categorized by the system 10. Note that user categorizations or groupings, such as groupings based on permission access levels, may be adjusted via the learning module user interface 36 of FIG. 1 by a user with appropriate permissions to perform the adjustments or modifications.

The top nodes 42-58 shown in the present example display screen 40 include a node corresponding to a person named Layla Henderson 50. While in the present embodiment, the Layla Henderson node 50 and remaining nodes are shown displaying limited information, additional information and or functionality may be illustrated without departing from the scope of the present teachings.

In FIG. 2, the Layla Henderson node 50 is considered to be a "central icon" or central node or central object. The central node is roughly centered within the display area and has relationships to other objects as indicated by connection lines emanating radially outward from the central node to connect to the other objects. In this example, the Layla Henderson node 50 is graphically coupled to a project manager node 42, a directs node 44, a connections node 46, a Kevin West node 48, a Redwood Shores node 52, a Human Capital Management (HCM) node 54, a skills node 56, and an employment node 58. The various ancillary nodes 42-48, 52-58 surrounding the top node Layla Henderson 50 represent data objects, which may contain additional data or functionality (not displayed in FIG. 1), which may be displayed in each node. The various ancillary nodes 42-48, 52-58 represent nodes that are related in some way to the Layla Henderson node 50. The ways in which the ancillary nodes 42-48, 52-58 are related to the Layla Henderson node 50 may be indicated via one or more labels (not shown) adjacent to lines connecting the ancillary nodes 42-48, 52-58 to the Layla Henderson node 50. Alternatively, connection information may be displayed or depicted via an intervening node.

The top nodes 42-58 represent a set of prominently displayed nodes and correspond to a portion of a web-like connection of various nodes in the system 10 of FIG. 1, which are selectively harvested from one or more databases of the ERP software 12. The Layla Henderson node 50 may represent a node of a current user that is logged into and that is accessing the system 10 and that is viewing the screen 40 via the display 24 of FIG. 1.

Figure 3:
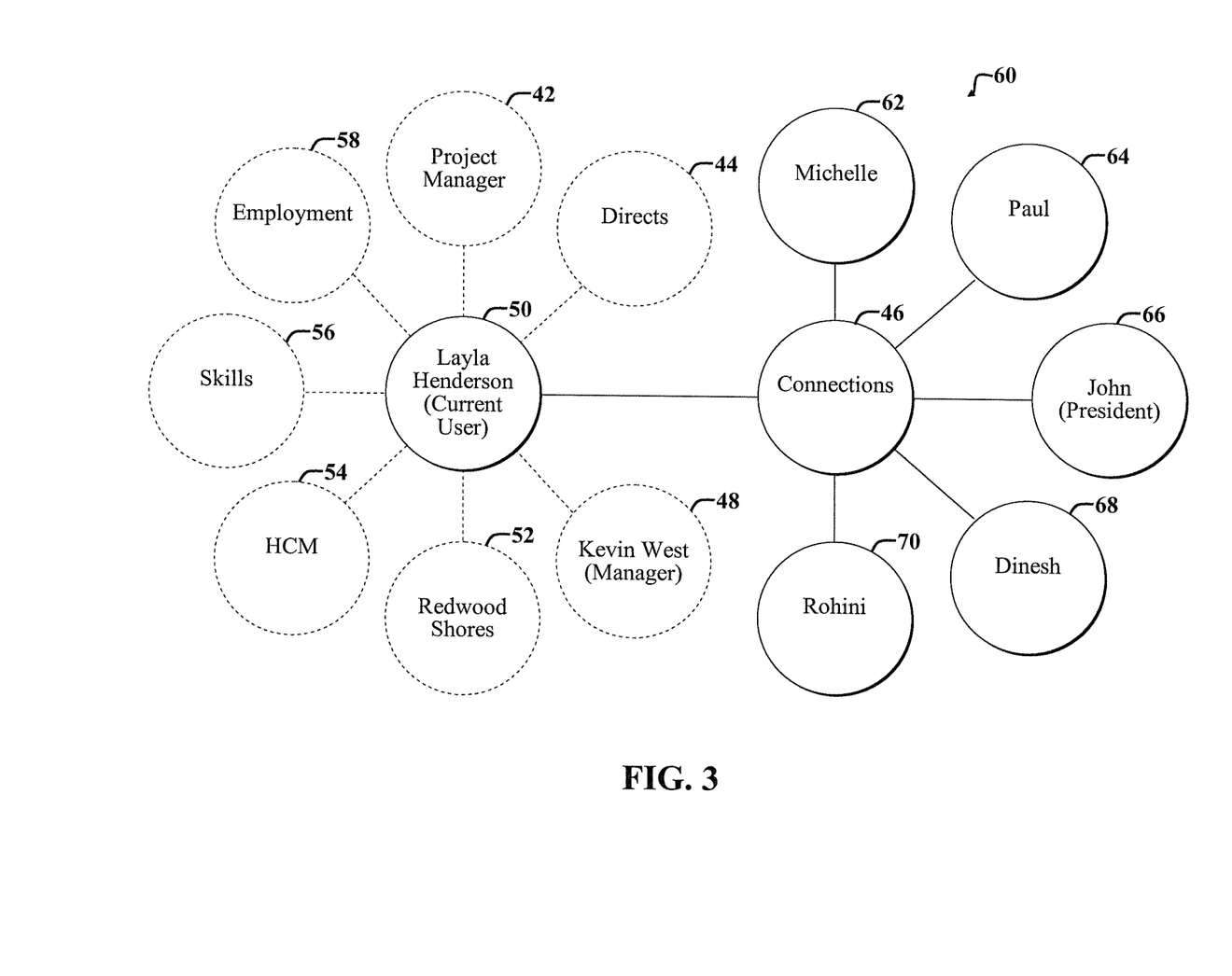
FIG. 3 is a diagram of a second example display screen activated in response to user selection of a displayed object, called a node, in the first display screen of FIG. 2

FIG. 3 is a diagram of a second example display screen 60 activated in response to user selection of the connections object 46 displayed in the first display screen 40 of FIG. 2. In the second example display screen, the ancillary nodes 42-48, 52-58 to the Layla Henderson node 50 are whited out, i.e., unfocused. The Layla Henderson node 50 remains not whited out, as the Layla Henderson node 50 is associated with a higher display prominence than the ancillary nodes 42-48, 52-58.

Selection of the connections node 46 has activated display of ancillary nodes 62-70 to the connections node 46. The selected node 46 is now the central node in the new display. Note that in other embodiments the selected node, itself, need not become a central node, but a different node or icon (i.e., a graphical representation of a database object or relationship) can become a central node or icon in response to selection of the selected node. In other examples there may be more than one central node displayed at a time. Other variations are possible. The example ancillary nodes 62-70 to the connections node 46 include nodes corresponding to particular persons, who may be fellow employees of Layla Henderson. The ancillary nodes 62-70 include a Michelle node 62, a Paul node 64, a John node 66, a Dinesh node 68, and a Rohini node 70. The ancillary nodes 62-70 may be considered connections of Layla Henderson 50, as they are connected to Layla Henderson 50 through the connections node 46.

Particular details specifying what constitutes a connection to Layla Henderson are application specific and may be user modifiable. For example, the navigation rules 30 may be modified to change how connections to a particular node are allocated. Additional functionality may be provided to enable an individual user to delete particular connected nodes from a node corresponding to the individual user. Such functionality may be accessible via one or more controls, e.g., buttons, right-click drop-down lists, and so on, which may be directly accessible via one or more objects displayed in the display screens, such as the display screen 60 of FIG. 3.

While in the present embodiment, the ancillary nodes 42-48, 52-58 to the Layla Henderson node 50 become unfocused as the user navigates away from the Layla Henderson node 50, embodiments are not limited to the unfocusing out of nodes in such cases. For example, the ancillary nodes 42-48, 52-58 to the Layla Henderson node 50 may be collapsed within the Layla Henderson node 50, as discussed more fully below with reference to FIG. 4.

Figure 4:
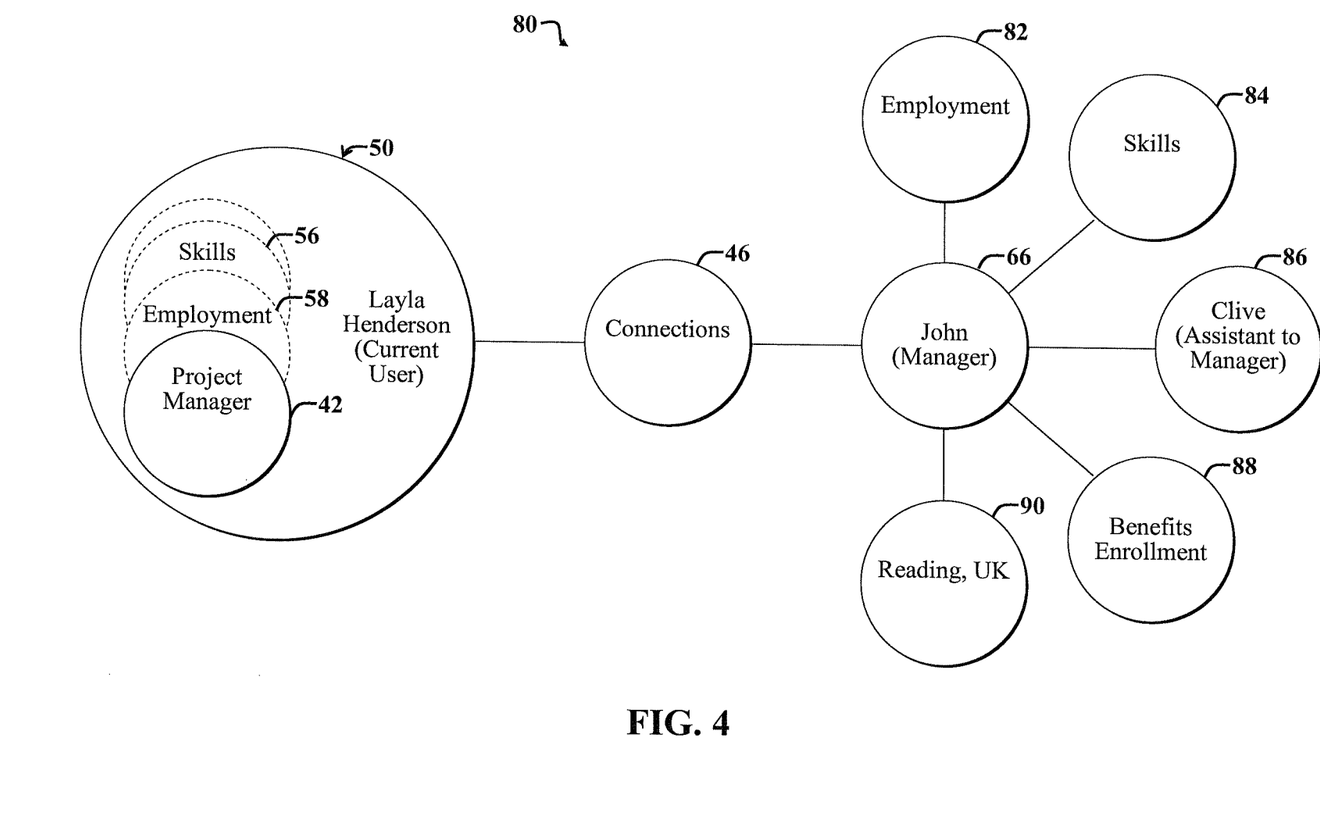
FIG. 4 is a diagram of a third example display screen activated in response to user selection of a node in the second display screen of FIG. 3 and further illustrating the nesting of nodes within a prominent node.

FIG. 4 is a diagram of a third example display screen 80 activated in response to user selection of the John node 66 in the second display screen 60 of FIG. 3 and further illustrating the nesting of ancillary nodes 42, 56, 58 within the prominent Layla Henderson node 50.

Note that while in the present embodiment, the collapsed ancillary nodes 42, 56, 58 are shown nested or cascaded, other display mechanisms may be employed. For example, the ancillary nodes 42, 56, 58 may disappear but may remain accessible via a drop down menu that is activated upon right clicking of the Layla Henderson node 50.

For illustrative purposes, upon selection of the John node 66 of FIG. 3, the remaining ancillary nodes 62-70 to the John node 66 become hidden. The hidden nodes may be accessed via a drop down menu activated upon right clicking of the John node 66 or via another mechanism. Alternatively, the ancillary nodes 62-70 to the John node 66 may be cascaded within the John node 66.

Additional ancillary nodes 82-90 associated with the John node 66 appear upon selection of the John node 66 from the display screen 60 of FIG. 3. The example additional ancillary nodes 82-90 include an employment node 82, a skills node 84, a Clive node 86, a benefits-enrollment node 88, and a Reading, UK node 90.

By viewing the ancillary nodes 82-90 to the John node 66, a user may determine that John has a benefits enrollment plan 88, resides in Reading, United Kingdom 90, has a particular skills set 84, and is associated with particular employment details 82.

Figure 5:
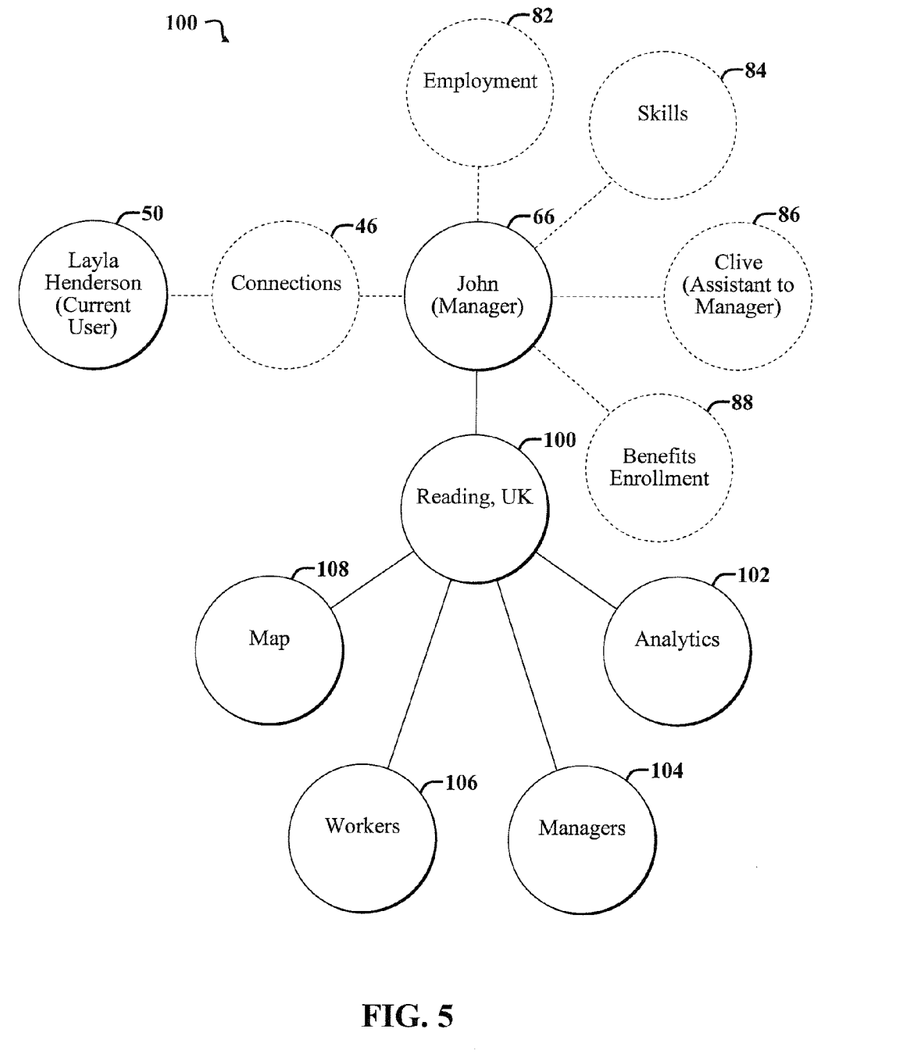
FIG. 5 is a diagram of a fourth example display screen activated in response to user selection of a node in the third display screen of FIG. 4.

FIG. 5 is a diagram of a fourth example display screen 100 activated in response to user selection of the Reading, UK node 90 of FIG. 4. Upon selection of the Reading UK node 100, ancillary nodes 102-108 to the Reading, UK node 100 appear. Simultaneously, the other ancillary nodes 82-88 to the John node 66 are unfocused. Alternatively, instead of unfocusing the ancillary nodes 82-88 to the John node 66, the ancillary nodes 82-88 may be shrunk and/or collapsed within the John node 66 or otherwise made accessible via a drop down menu or other mechanism.

The illustrative ancillary nodes 102-108 to the Reading, UK node 100 include an analytics node 102, a managers node 104, a workers node 106, and a map node 108. Selection of any of the ancillary nodes 102-108 to the Reading, UK node 100 may cause display of additional information and/or functionality related to the Reading, UK node 100. For example, selection of the map node 108 may activate mapping functionality, whereby a map of Reading, UK is displayed. Selection of the workers node 106 may display all worker employees working in or residing in Reading, UK. Similarly, selection of the managers node 104 may activate display of nodes showing managers residing in Reading, UK. Selection of the analytics node 102 may activate software for analyzing certain aspects of the enterprise associated with Reading, UK, such as sales volume, revenue, and so on.

Figure 6:
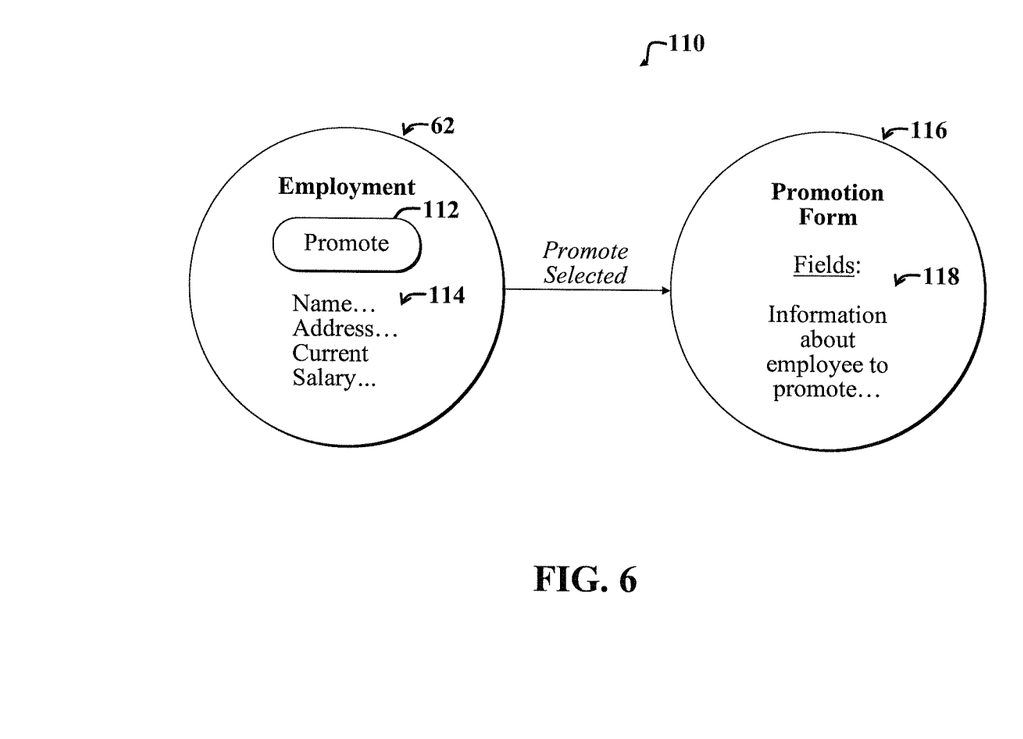
FIG. 6 is a diagram of a fifth example display screen illustrating operation of a registered action for transferring data from a first node to a second node in response to selection of the second node after selection of the first node.

FIG. 6 is a diagram of a fifth example display screen 110 illustrating operation of a registered action for transferring data from a first node 62 to a second node 116 in response to selection of the second node 116 after selection of the first node 62.

In the present example, the first node represents an employment node 62, which includes a promote button 112 and information 114 associated with a particular user, such as John (as represented by the John node of FIGS. 3-5) to which the employment node 62 is ancillary. If, for example, Layla (as represented by the Layla Henderson node 50 of FIGS. 2-5) is the current user and is the president or otherwise has authority to promote John, then the promote button 112 may appear when Layla Henderson selects the employment node 62 in connection with John.

Upon selection of the employment node 62, a promotion form node 116, which includes a promotion form 118, may appear. In addition a promote button 112 and information pertaining to John, e.g., address, salary, and so on, appears in the employment node 62. Note that the promote button 112 and John's information may be displayed as nodes separate from the employment node 62 without departing from the scope of the present teachings.

In the present example embodiment, selection of the promote button 112 by the current user (Layla Henderson), followed by selection of the promotion form node 116 effects transfer of John's information 114 into appropriate fields 118 of the promotion form 116. This type of action may be registered via the user interface 36 and navigation rules 30 of FIG. 1. Note that other mechanisms for registering actions other than those disclosed herein may be employed without departing from the scope of the present teachings. For example, actions could be predefined and could be accessible for selection by authorized users of the system 10 of FIG. 1 for use in the graphical displays output by the display 24 of FIG. 1.

Hence, with reference to FIGS. 1-6, use of the system 10 may facilitate growing or developing displayed relationships by the way users are navigating data. For example, if users often click through several particular displayed objects, i.e., nodes, to get to a particular object, eventually access to the destination object may get closer to the first object or may otherwise begin to appear more prominently when accessing the particular object.

Furthermore, the system 10 is adapted to enable cross-learning, whereby navigation behavior of other related users can be learned, and this learned information may be employed to offer informative navigation suggestions to a particular user.

In addition, the graphical user interface software 20 of FIG. 1 may reference instructions or navigation rules 30 for causing the most frequently clicked nodes by users of a particular group or categorization to be set as the top nodes for a default display. Alternatively, the nodes and connections to be displayed by default may be predetermined by individual users or by a system administrator with access to the learning module 16 via the user interface 36 of FIG. 1.

Figure 7:
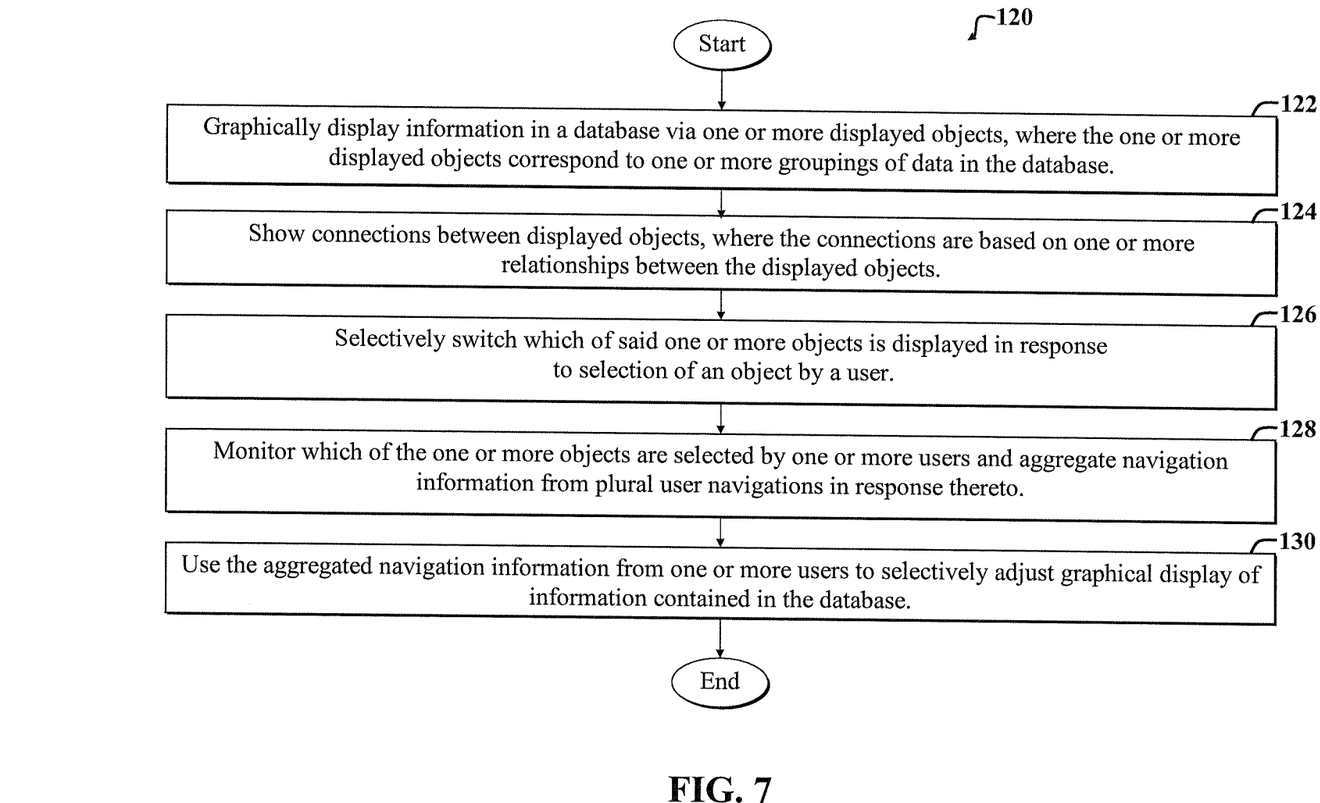
FIG. 7 is a flow diagram of an example method that is adapted for use with the system of FIG. 1 and the user interface displays of FIGS. 2-6.

FIG. 7 is a flow diagram of method 120 adapted for use with the system 10 of FIG. 1 and the user interface displays 40, 60, 80, 100, 110 of FIGS. 2-6. The example method 120 for navigating data in a computing environment includes a first step 122, which includes graphically displaying information in a database via one or more displayed objects, where the one or more displayed objects correspond to one or more groupings of data and/or functionality in the database.

For the purposes of the present discussion, a group of data may include one or more elements or pieces of data. The data may be maintained via a database included in an Enterprise Resource Planning (ERP) system, such as the ERP system 12 of FIG. 12, which is included in the computing environment.

A second step 124 includes displaying connections between displayed objects, where the connections are based on relationships between the displayed objects.

A third step 126 includes selectively switching which of the one or more objects is displayed in response to selection of an object by a user.

A fourth step 128 includes monitoring which of the one or more objects are selected by one or more users and aggregating navigation information from plural user navigations in response thereto.

A fifth step 130 includes using the aggregated navigation information from one or more users to selectively adjust graphical display of information contained in the database. The learning may involve monitoring and learning one or more navigation behaviors of users based on user selections of objects and/or sequences of user selections of objects.

Note that various steps 122-130 of the method 120 are illustrative. Certain steps may be omitted or interchanged with other steps, and additional steps may be added at different positions in the method 120 without departing from the scope of the present teachings. For example, an additional step may include displaying an object to a particular user based on data-navigating behavior of other users associated with the particular user. The other users associated with the particular user may have similar roles as the user in a particular enterprise or may be associated with similar data-access permissions.

The method 120 may further include obtaining user information pertaining to the user, where the user information including user data-access privileges, and then adjusting graphical display of data to the user based on the user information. Another example step includes selectively transferring information from a first object to a second object, the second object of which is to be graphically displayed to a user, based on an object-selection sequence chosen by the user. Another example step includes employing a user-modifiable metadata store to maintain information affecting graphical display of data.

The various embodiments described herein may be adapted to run on various processing systems, such as one or more computers. A data storage device, such as hard drive, may accommodate storage of data in the databases and/or storage of computer readable instructions for implementing various functionality described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for navigating among Enterprise Resource Planning (ERP) data stored in a database in a computing environment, the method comprising the following acts performed by a digital processor:
   receiving, using the digital processor, input from a first user requesting access to objects stored in the ERP database;
   displaying, using the digital processor, a predetermined plurality of icons, wherein
      locations in a display and display characteristics of the predetermined plurality of icons are automatically customized based on learned information regarding navigation behaviors of the first user and other users having similar access permission as the first user,
      the learned information stored as metadata in the computing environment, and
      the predetermined plurality of icons corresponds to one or more groupings of the objects stored in the ERP database;
   displaying, using the digital processor, connections between the plurality of displayed icons, wherein the connections are based on one or more relationships between the plurality of displayed icons in the ERP database, wherein
      one icon is a central icon of the one or more relationships,
      the central icon is centrally displayed and includes a multiple of the connections spanning radially outward to multiple other displayed icons;
   selectively adjusting, using the digital processor, prominence of display of a particular icon based on a frequency of which the particular icon is selected by one or more users of the ERP database as indicated by the learned information;
   accepting, using the digital processor, a signal from a user input device to designate a selected icon;
   performing, using the digital processor, a particular action based on the designation of the selected icon, wherein
      the action is determined by previously stored user-defined navigation parameters augmented by an administrator of the ERP database,
      a particular augmented user-defined navigation parameter includes a description of the particular action including requisite instructions and information for implementing the particular action,
      the designation of the selected icon creates a new display of multiple additional icons and connections with the selected icon being centrally displayed and including the multiple additional connections spanning radially outward to the multiple additional displayed icons; and
   storing, using the digital processor, information pertaining to user navigation of the icons of the first user as a part of the metadata.

2. The method of claim 1, with the data being maintained in an ERP system in a networked computing environment.

3. The method of claim 2, further including displaying at least one of the predetermined plurality of icons to the first user based on data-navigating behaviors of the other users associated with the first user.

4. The method of claim 3, wherein the other users associated with the first user have similar roles as the first user in a particular enterprise.

5. The method of claim 2, further comprising:
   obtaining user information pertaining to the first user, the user information including user data-access privileges, and
   adjusting graphical display of the data to the first user based on the user information.

6. The method of claim 2, with the performing the particular action further comprising:
   selectively transferring information from the selected icon to a second icon according to a registered action, the second icon to be graphically displayed to a the first user, based on an icon-selection sequence chosen by the first user.

7. The method of claim 2, further including using a user-modifiable metadata store to maintain information affecting graphical display of the data.

8. A system for facilitating data navigation among Enterprise Resource Planning (ERP) data stored in a database in a computing environment, the system comprising:
   one or more digital processors;
   a user input device coupled to at least one of the digital processors;
   a display coupled to at least one of the digital processors;
   a processor-readable storage device including instructions executable by the one or more digital processors to execute instructions for:
   receiving, using the user input device, input from a first user requesting access to objects stored in the ERP database;
   displaying, on a graphical user interface of the display, a predetermined plurality of icons, wherein
      locations in a display and display characteristics of the predetermined plurality of icons are automatically customized based on learned information regarding navigation behaviors of the first user and other users having similar access permission as the first user,
      the learned information stored as metadata in the computing environment by a learning module, and the predetermined plurality of icons corresponds to one or more groupings of the objects stored in the ERP database;

displaying, on the graphical user interface of the display, connections between the plurality of displayed icons, wherein the connections are based on one or more relationships between the plurality of displayed icons in the ERP database, wherein one icon is a central icon of the one or more relationships, the central icon is centrally displayed and includes a multiple of the connections spanning radially outward to multiple other displayed icons;

selectively adjusting, using the one or more digital processors, prominence of display of a particular icon based on a frequency of which the particular icon is selected by one or more users of the ERP database as indicated by the learned information;

accepting, using the one or more digital processors, a signal from a user input device to designate a selected icon;

performing, using the one or more digital processors, a particular action based on the designation of the selected icon, wherein the action is determined by previously stored user-defined navigation parameters augmented by an administrator of the ERP database, a particular augmented user-defined navigation parameter includes a description of the particular action including requisite instructions and information for implementing the particular action, the designation of the selected icon creates a new display of multiple additional icons and connections with the selected icon being centrally displayed and including the multiple additional connections spanning radially outward to the multiple additional displayed icons; and storing, using the one or more digital processors, information pertaining to user navigation of the icons of the first user as a part of the metadata.

9. The system of claim 8, further including computer readable instructions in communication with the learning module, the computer readable instructions including instructions adapted to employ the graphical user interface to suggest one or more navigations to the first user based on navigation information collected from the one or more users.

10. The system of claim 9, wherein the one or more users are characterized by a similar categorization.

11. The system of claim 8, wherein the graphical user interface is in communication with a graphical display generator, wherein the graphical display generator is adapted to implement instructions for initially displaying the predetermined plurality of icons when the first user logs into the system based on the learned information.

12. The system of claim 11, wherein the graphical display generator is further adapted to implement instructions for selectively collapsing one or more of the plurality of displayed icons within one or more other of the plurality of displayed icons, thereby enabling nesting of icons based on the one or more relationships between the one or more icons.

13. The system of claim 8, wherein the learning module includes instructions for adjusting the one or more relationships between one or more of the plurality of displayed icons in accordance with user navigations of the data as indicated by the learned information.

14. The system of claim 8, wherein the graphical user interface is adapted to selectively transfer information from a first icon to a second icon according to a particular action in response to selection of the second icon via the first icon in accordance with one or more navigation rules.

15. A tangible processor-readable storage device including instructions executable by a processor for navigating among Enterprise Resource Planning (ERP) data stored in a database in a computing environment, the processor-readable storage device including one or more instructions for:

receiving input from a first user requesting access to objects stored in the ERP database;

displaying a predetermined plurality of icons, wherein locations in a display and display characteristics of the predetermined plurality of icons are automatically customized based on learned information regarding navigation behaviors of the first user and other users having similar access permission as the first user, the learned information stored as metadata in the computing environment, and the predetermined plurality of icons corresponds to one or more groupings of the objects stored in the ERP database;

displaying connections between the plurality of displayed icons, wherein the connections are based on one or more relationships between the plurality of displayed icons in the ERP database, wherein one icon is a central icon of the one or more relationships, the central icon is centrally displayed and includes a multiple of the connections spanning radially outward to multiple other displayed icons;

selectively adjusting prominence of display of a particular icon based on a frequency of which the particular icon is selected by one or more users of the ERP database as indicated by the learned information;

accepting a signal from a user input device to designate a selected icon;

performing a particular action based on the designation of the selected icon, wherein the action is determined by previously stored user-defined navigation parameters augmented by an administrator of the ERP database, a particular augmented user-defined navigation parameter includes a description of the particular action including requisite instructions and information for implementing the particular action, the designation of the selected icon creates a new display of multiple additional icons and connections with the selected icon being centrally displayed and including the multiple additional connections spanning radially outward to the multiple additional displayed icons; and storing information pertaining to user navigation of the icons of the first user as a part of the metadata.

* * * * *

UNITED STATES PATENT AND TRADEMARK OFFICE
CERTIFICATE OF CORRECTION

| | | |
|---|---|---|
| PATENT NO. | : 8,655,880 B2 | Page 1 of 1 |
| APPLICATION NO. | : 12/753067 | |
| DATED | : February 18, 2014 | |
| INVENTOR(S) | : Dinesh Arora | |

It is certified that error appears in the above-identified patent and that said Letters Patent is hereby corrected as shown below:

In the Specification:

In column 9, line 2, delete "and or" and insert -- and/or --, therefor.

In the Claims:

In column 14, line 40, in Claim 6, delete "a the" and insert -- the --, therefor.

Signed and Sealed this
Twenty-fourth Day of June, 2014

Michelle K. Lee
*Deputy Director of the United States Patent and Trademark Office*